J. H. HALL.
TRAP.
APPLICATION FILED JAN. 9, 1918.

1,349,453.

Patented Aug. 10, 1920.
2 SHEETS—SHEET 1.

Inventor
J. H. Hall,

By
E. Hume Talbert
Attorney

J. H. HALL.
TRAP.
APPLICATION FILED JAN. 9, 1918.
1,349,453.
Patented Aug. 10, 1920.
2 SHEETS—SHEET 2.
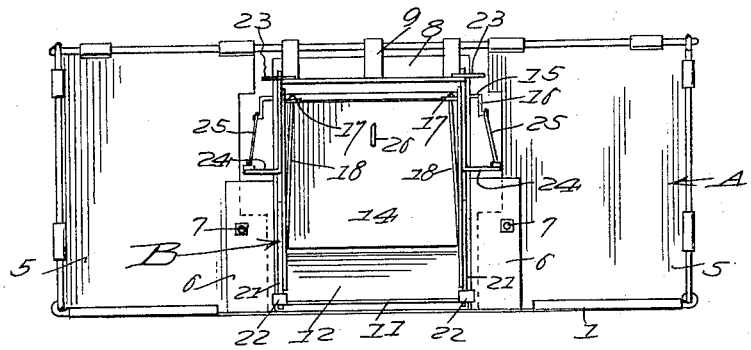
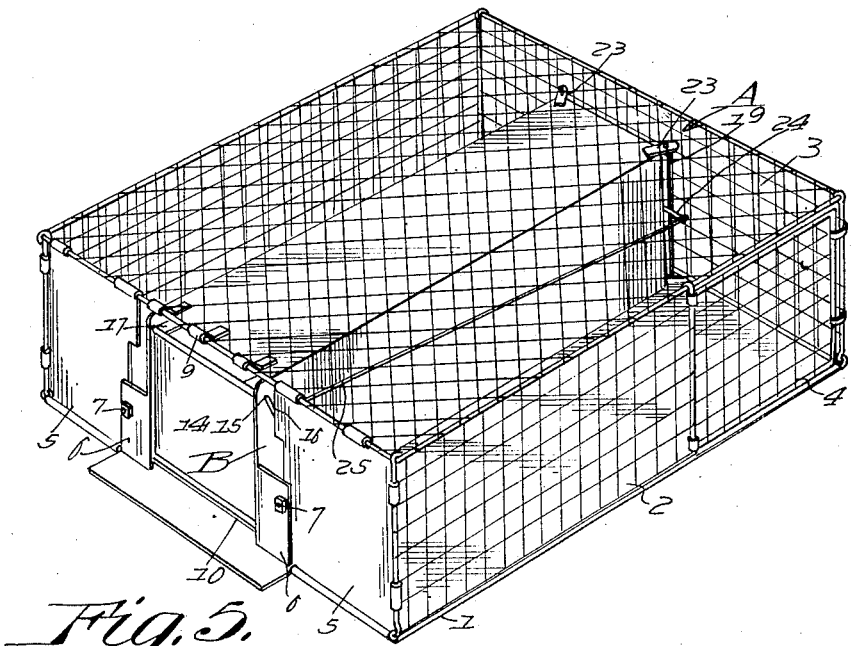
Inventor
J. H. Hall,
By
Attorney

UNITED STATES PATENT OFFICE.

JAMES H. HALL, OF MOUNTAIN GROVE, MISSOURI.

TRAP.

1,349,453.　　　Specification of Letters Patent.　　Patented Aug. 10, 1920.

Application filed January 9, 1918. Serial No. 211,040.

*To all whom it may concern:*

Be it known that I, JAMES H. HALL, a citizen of the United States of America, residing at Mountain Grove, in the county of Wright and State of Missouri, have invented new and useful Improvements in Traps, of which the following is a specification.

The invention belongs to that class of traps in which the victim is captured without being killed or maimed.

The principal object of the invention is to provide a trap of this character which will remain always set properly to catch new victims, the device being so arranged that the victim entraps itself and arranges the trap for the entrapping of other victims.

A further object of the invention is the provision of a cage for the entrapped animals and a tubular member conjoined with the cage, through which tubular member the animals are required to pass to find their way into the cage. The tubular member is separable from the cage and may be inserted in the latter when the trap is not in use, thereby reducing the amount of space required by the trap when in storage.

A still further object of the invention is to provide a device of this character which is simple in construction, durable and effective in operation and which may be manufactured at a low cost.

Other and further objects will appear as the invention is set forth in detail in the description which follows:

The invention is illustrated and described in what is thought to be its most satisfactory embodiment. The actual reduction to practice, however, may show certain changes or alterations to be of advantage and the right is claimed to make any which do not depart from the spirit of the appended claim.

The same numerals of reference designate the same parts throughout the several figures of the drawings, wherein:

Fig. 4 is a section on the line 4—4 of Fig. 1.

Fig. 5 is a perspective view of the trap with the tubular member inserted in the cage.

Figure 1:
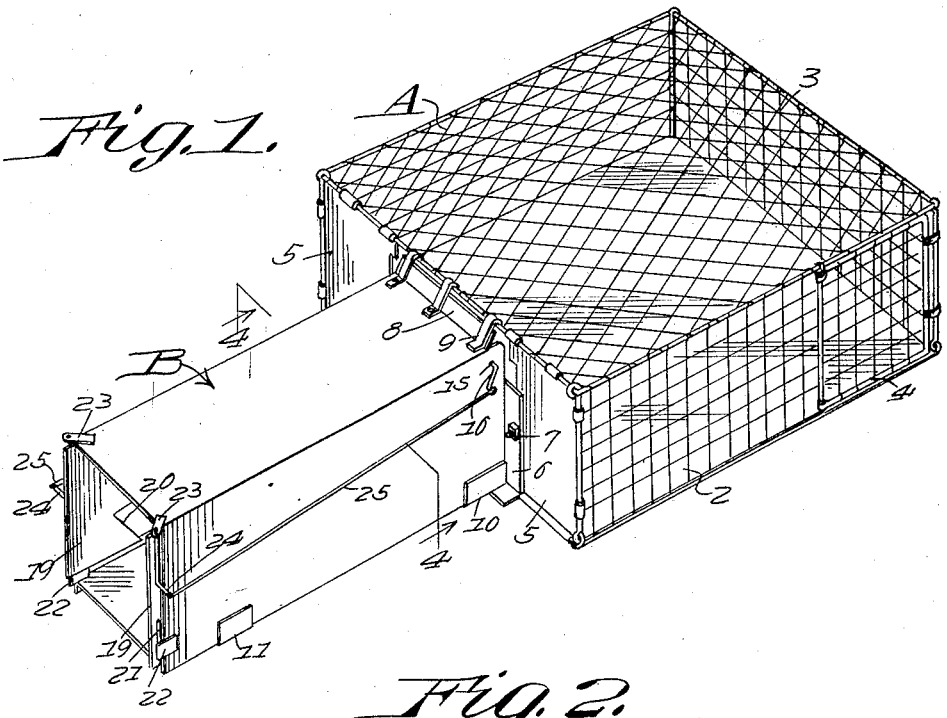
Figure 1 is a perspective view of the improved trap.
Figure 2:
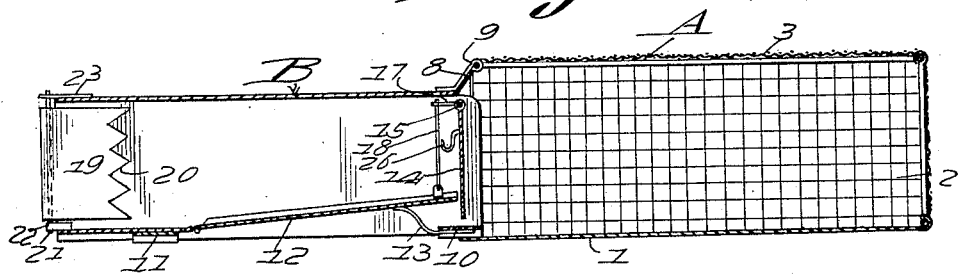
Fig. 2 is a longitudinal sectional view.
Figure 3:
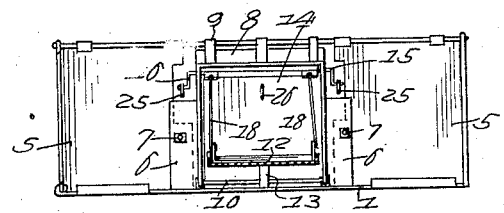
Fig. 3 is a front view.

Referring to the drawings, the trap is shown as being composed of the cage A and the tubular member B which is attached to the cage. The cage comprises the bottom 1 to which the wire frame 2 is attached, the latter being covered on the top and on three sides by a wire mesh 3. The door 4, made of a suitable wire frame and covered with a suitable mesh is set in one side of the cage A and affords means for access into the interior of the cage and for removing the entrapped animals therefrom.

On that side of the cage which does not contain the wire mesh, two metal plates 5 are suitably attached, the two plates being in spaced relation to each other, so that the tubular member B may be attached to the cage between them to permit entrapped animals to pass from it into the cage.

The tubular member B is made preferably of sheet metal and is left open at either end. On the rear end where it connects with the cage, flanges 6 are formed on the side of the tubular member and the latter is attached to the plates 5 by suitable bolts 7 which pass through the flanges 6 and through the plates 5. A flange 8 is also formed on the top of the tubular member B at its rear end and to this flange there are attached hook members 9 which detachably connect with the adjoining upper portion of the frame 2.

A narrow plate 10 is fixed across the bottom of the tubular member B at its rear end and a similar plate 11, of greater width than the plate 10 is also suitably fixed across the bottom of the tubular member B at the front end. A movable bottom 12 is pivotally mounted in the tubular member adjacent one end of the plate 11 and the free end of this movable bottom over hangs the narrow plate 10. The movable bottom 12 is held normally raised at its free end by a flat spring 13 which is fixedly attached on the bottom of the plate 11 and presses upon the under face of the movable bottom 12.

The rear end of the tubular member B where it opens on the cage A is provided with a swinging door 14 which is pivotally mounted near the top of the tubular member, being fixed on a shaft 15 which passes through the side wall of the tubular member exterior to which crank portions 16 are formed on the shaft. These crank portions obtain in a plane disposed at an angle with the plane of the door. At the upper end of the door and adjacent either side, arms 17 are formed, these arms being disposed in a plane at substantially right angles to the plane of the door. Links 18 pivotally connect with the arms 17 and also pivotally connect with the movable bottom 12 on either side thereof, the length of the links being such that when the movable bottom 12 is in its raised position, the door 14 may attain the position of closure for the rear end of the tubular member B.

At the forward end of the tubular member B, there is mounted a pair of doors 19, each of which on its free edge is provided with a plurality of angular shaped recesses which leave the pointed projections 20. The doors 19 are attached to the tubular member B by having the rods 21 to which they are secured, pivotally engage the hinge members 22 and 23 which are positioned at the top and near the bottom of the tubular member respectively. The doors 19 are adapted, when opening the front end of the tubular member B to swing in the latter against the sides thereof and each door carries near its hinged edge and substantially at its vertical center an arm 24 which stands in a plane at right angles to the plane of the door.

The crank portions 16 of the shaft 15 are connected one to each of the arms 24 by means of connecting rods 25, the length of the connecting rods being such that when the swinging door 14 is in the position of closure, the doors 19 are standing in the open position.

The door 14 has attached to it on the inside a hook 26 designed as a means for holding a bait for enticing animals into the trap.

When the trap is put in operation, the hook 26 is supplied with a suitable bait. The normal position of the movable bottom being such that the door 14 hangs in the position of closure and the free end of the movable bottom lies in a raised position, the front doors 19 will stand in the open position. The animal victims may find their way into the tubular member B through the open doors 19, but when they advance toward the rear end of the tubular member to attack the bait, their weight on the movable bottom 12 will result in the depression of the latter against the pressure of the spring 13. The pressure on the bottom 12 results in the raising of the door 14 because of the link connections 18 between the door 14 and the movable bottom 12. Simultaneously with the raising of the door 14, the front doors 19 are brought toward a position of closure. These doors 19, do not, however, move to a position at right angles to the length of the tubular member but to a position where the projections 20 on the one engage the triangular recesses formed on the other the projections on the two doors being alternately disposed. The combined width of the two doors 19 is greater than that of the tubular member B. Therefore, when the projections of the one engage the recesses of the other, the projections are presented to an entrapped animal in the event that he should back out of the tubular member B. With the raising of the swinging door 14, the entrapped animal can find his way into the cage A and when he has passed into the latter, the spring 13 operates to raise the movable bottom 12 and to allow the swinging door 14 to fall into the position of closure thereby opening the doors 19 and restoring the device to a position preparatory to entrapping more victims.

When it is desired to put the trap away for safe keeping, when not in use, the tubular member B may be disconnected from the cage A and inserted in the cage, as shown in Fig. 5. The operation of separating the tubular member B from the cage consists in loosening the bolts 7, when the tubular member may thereafter be separated from the cage by disengaging the hook members 9 from the top of the wire frame 2.

The invention having been described, what is claimed as new and useful is:

A trap comprising a cage, a tubular member extending from the cage but communicating with the latter at its point of junction therewith, a transversely disposed shaft journaled in opposite sides of the tubular member adjacent the cage and provided with crank portions exterior to the tubular member, a door attached to said shaft for vertical swinging movement from open to closed position to open and close communication between the tubular member and the cage, vertically disposed rods pivotally mounted on opposite sides of the tubular member at the end remote from the cage, a door secured to each rod member so that the two may swing back into the tubular member to open the end thereof or swing transversely across the tubular member to close the said end, each door being provided with an arm projecting to the opposite side of the axis of the rod member to which it is attached, and connecting rods having their one end pivotally connected to one of the said arms and their remaining ends to the aforesaid crank portion.

In testimony whereof I affix my signature.

JAMES H. HALL.